March 1, 1966 C. H. EDDINS 3,237,324
ANGLED BLADE LAND LEVELER
Filed April 22, 1965 2 Sheets-Sheet 1
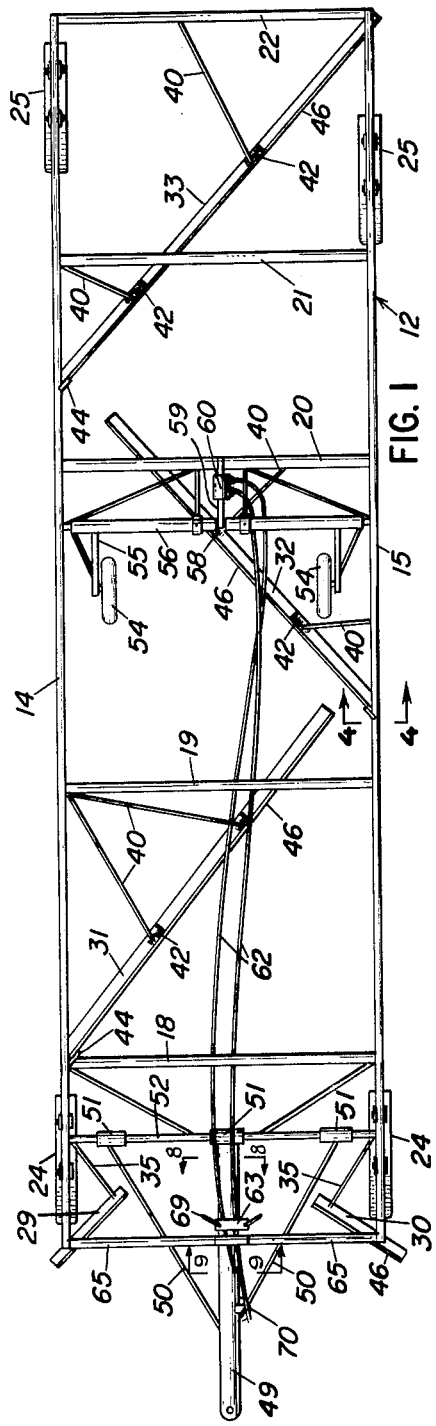
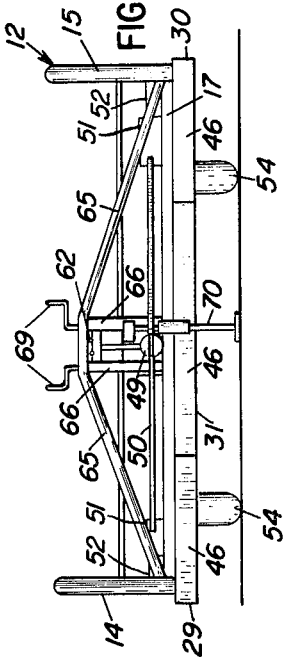
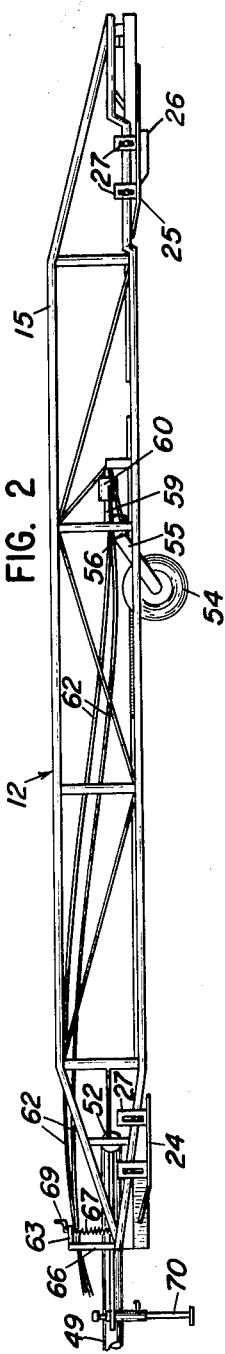
Curtis H. Eddins
INVENTOR
BY Raymond N. Matson
ATTORNEY March 1, 1966

C. H. EDDINS 3,237,324

ANGLED BLADE LAND LEVELER

Filed April 22, 1965

Curtis H. Eddins
INVENTOR

BY Raymond N. Matoon
ATTORNEY

United States Patent Office 3,237,324
Patented Mar. 1, 1966

3,237,324
ANGLED BLADE LAND LEVELER
Curtis H. Eddins, 801 E. 2nd St., Stuttgart, Ark.
Filed Apr. 22, 1965, Ser. No. 453,868
11 Claims. (Cl. 37—150)

This invention relates generally to land leveling apparatus and more particularly to an improved tractor towed drag or sled type land lever provided with a plurality of angled scraping blades and with vertically extensible supporting wheels to enable it to be moved to and from the land to be leveled, and is a continuation-in-part of my application, Serial Number 269,249, filed April 1, 1963, now abandoned.

Land levelers of this general type are known in the art but as a whole, are characterized by one or more objectionable features. Among these are: the use of swiveled supporting wheels during land leveling operations which permits the turning of the leveler frame angularly with respect to its longitudinal axis and the direction of motion when high spots or obstructions such as stumps are encountered to result in a zig zag path and poor and inefficient leveling of that area; the use of four supporting wheels during leveling so that the weight of the apparatus plus that of the earth being pushed is too great per wheel so as to also result in inefficient leveling; the use of full length skids so that when one or the other skids encounters a high spot, the scraping blades are raised above the dirt being scraped to leave high and uneven areas; the use of the bottom rails of the apparatus frame as skids so that instead of readily replacing worn skids, the owner must junk the apparatus or pay major repair costs to substitute and connect new bottom frame rails; the use of elaborate, costly and impractical means for pivoting the scraper blades so as to swing rearwardly when an obstruction is encountered; and an inability of the towing tractor and the leveler to make short turns during leveling operations.

Accordingly, the main object of the present invention is to provide an improved land leveler which will obviate the above and other objectionable features of land leveling apparatus.

An important object of the present invention is to provide an improved land leveler having a plurality of longitudinally spaced angularly disposed, cooperating blades which scrape the dirt and pass it back and forth several times as it passes through the leveler so as to cut down high spots and fill in low spots in the area traversed by the leveler which is provided with fixed rudders to maintain a substantially straight, forward course and prevent an inefficient zig zag traversing of the apparatus over the land to be leveled.

Another important object of the present invention is to provide an improved land leveler of the type described and having four readily replaceable, vertically adjustable, supporting skids for full-trailer, land leveling operations, and with a pair of vertically extensible wheels mounted aft of but adjacent to the middle of the leveler frame for semi-trailer, non-leveling transport operations thereof or for making short turns in tight corners during leveling.

A further important object of the present invention is to provide an improved land leveler of the type described wherein the forwardmost pair of scraping blades extend laterally outward of the leveler frame in front of the path of the supporting skids to level the same to effect a more efficient leveling of the area traversed by the leveler.

A still further important object of the present invention is to provide an improved land leveler of the type described wherein the angled scraping blades are highly polished to enable an effective handling of wet dirt which would otherwise pile up on and overload the blades, and wherein the blades are pivotally mounted at a point above their upper edges so as to enable their rearward pivoting with adequate clearance when engaged by obstructions such as stumps, without damage to their pivotal mountings.

Another important object of the present invention is to provide an improved land leveler adapted to be pulled over the ground as a trailer by a tractor, etc. by means of a novel hitch which permits relative movement between the leveler and the towing vehicle, and which hitch cooperates with a pair of wheels extensibly mounted on the leveler so as to tow the leveler as a semi-trailer in non-leveling operations.

A further important object of the present invention is to provide an improved land leveler of the type described which will be of simple but strong and lightweight construction, of long life in use, and susceptible of ready and economic manufacture.

Other objects and advantages of the invention will become apparent during the course of the following description.

In the drawings I have shown one embodiment of the invention. In this showing:

FIGURE 1 is a top plan view of the land leveler comprising the present invention;

FIGURE 2 is a side elevational view thereof;

FIGURE 3 is a front end elevational view thereof to an increased scale;

Figure 4:
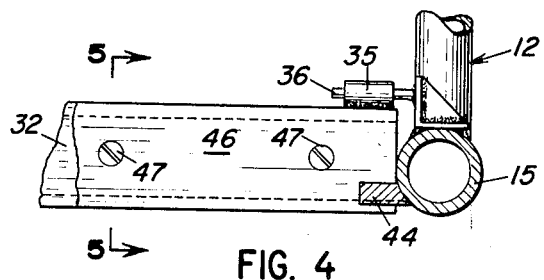
FIGURE 4 is a fragmentary horizontal sectional view to a further increased scale of the pivotal blade mounting of the apparatus taken on the line 4—4 of FIGURE 1.

Referring to the drawings, numeral 12 designates as a whole the land leveler comprising the present invention which includes an elongated, rectangular box frame formed of laterally spaced, truss type side rails 14, 15, which are rigidly connected by transverse frame members 17, 18, 19, 20, 21, 22. While the frame is shown as being of welded tubular steel construction, it may also be strongly and economically formed of angle irons.

Figure 11:
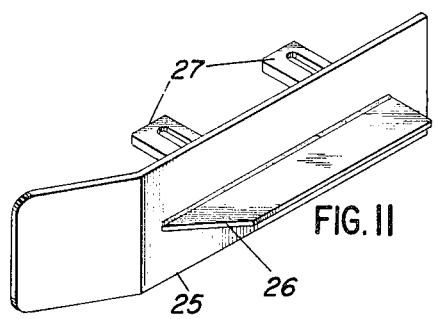
FIGURE 11 is a perspective view of one of the leveler supporting rear gauge shoes with its rudder which prevents lateral movement of the leveler during leveling operations.
Figure 10:
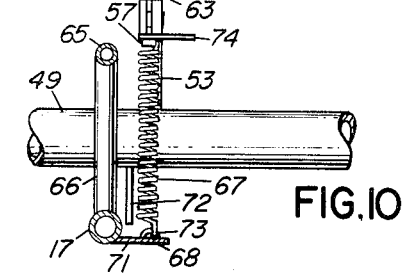
FIGURE 10 is a side elevational view thereof.
Figure 9:
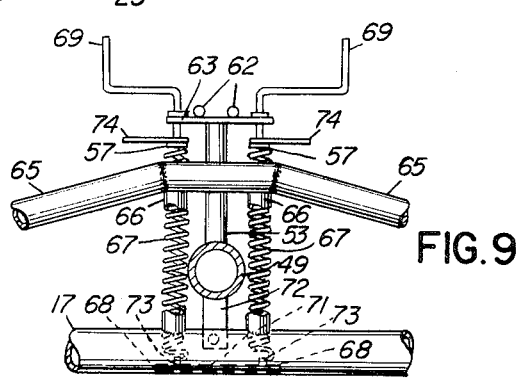
FIGURE 9 is a view similar to FIGURE 8 taken on the line 9—9 of FIGURE 1, parts being broken away.

The leveler frame is supported out of contact with the ground by means of front and rear gauge shoe skids 24, 25 of plate steel which are mounted for vertical adjustment to control depth of cut, adjacent the corners of the frame (FIGURES 1, 2 and 11). The rear skids 25 are provided with fixed rudders 26 to prevent lateral movement of the frame during land leveling operations. The front and rear ends of the frame are displaced upwardly to accommodate the skids which are mounted thereunder and attached by means of bolts and brackets 27. The vertical adjustment of the skids to control the depth of cut of the scraper blades is necessitated by various types of soil and the moisture content thereof. The gauge shoe skids 24, 25 keep the frame in uniform working position and eliminate the bounce and chatter characteristic of apparatus in which the weight is supported by wheels which, of course, do not have anywhere near the supporting surface of the skids of the present invention and thus actually form ruts while presumably leveling the ground.

The land leveler frame is equipped with a plurality of scraper blade supporting moldboards 29, 30, 31, 32 and 33 formed of channel iron as best seen in FIGURE 1. The relatively short moldboards 29 and 30 at the front of the leveler are rigidly connected as by welding to the truss side rails 14 and 15 respectively and to braces 35 rigidly connected thereto, and are angularly arranged so as to extend from a scraping position outwardly of and in front of the supporting skids 24, inwardly, and rearwardly. Thus, during leveling operations, the scraping blades (to be described) mounted on the moldboards 29 and 30, level and smooth a path for the frame supporting skids 24, 25 by removing high spots so as to add to the stability and overall efficiency of the leveler.

The moldboards 31 and 33 extend angularly and rearwardly from the truss rail 14 toward the truss rail 15 with the moldboard 31 terminating short of the rail 15 to provide a dirt passage between its rearward end and the moldboard 32 which extends angularly and rearwardly from the truss rail 15. The latter moldboard terminates short of the moldboard 33 to form another dirt passage and the latter extends to the truss rail 15 and discharges any dirt not previously deposited in low spots between it and the adjacent frame supporting skid 25.

Figure 5:
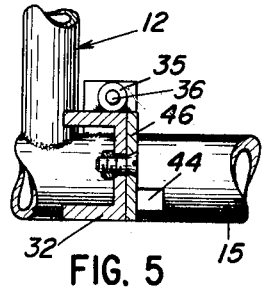
FIGURE 5 is a transverse, vertical secional view thereof taken on the line 5—5 of FIGURE 4, parts being shown in elevation.
Figure 6:
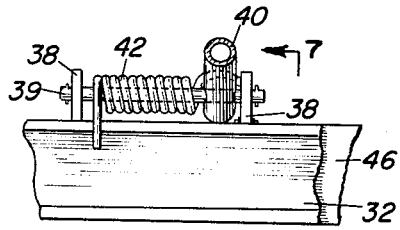
FIGURE 6 is a fragmentary elevational view of a scraper blade supporting brace and pivot with its associated spring means for maintaining a blade in operative position.
Figure 7:
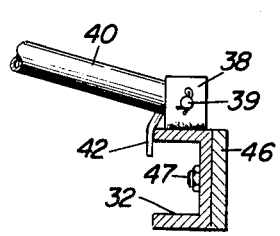
FIGURE 7 is a transverse sectional view thereof.
Figure 8:
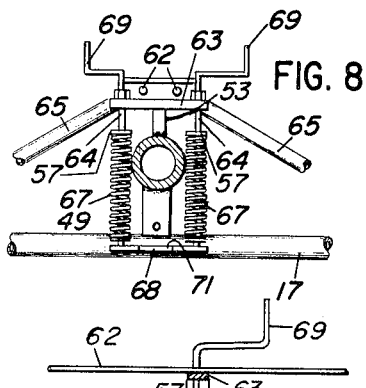
FIGURE 8 is a fragmentary elevational view to a decreased scale taken on the line 8—8 of FIGURE 1 and showing the spring connection of the pivoted hitch with the leveler frame at a point forward of hitch pivot.

Because the land leveler is often used on newly cleared land containing stumps, roots and other obstructions, it is desirable to pivotally mount moldboards 31, 32 and 33 so that upon engaging such obstructions the moldboards with their scraping blades will pivot rearwardly and pass thereover and thus avoid damage to the leveler. To this end, the moldboards are each provided at their outer end with a sleeve bearing 35 which is pivotally supported by a pivot pin 36 fixed to the adjacent truss rail 14 or 15 (FIGURES 4 and 5). At spaced points intermediate their length, the moldboards 31, 32, and 33 are also provided with spaced apertured mounting brackets 38 each of which receive a pivot pin 39 rigidly fastened as by welding to the ends of braces 40 which are similarly rigidly connected to the truss frames 14 or 15 (FIGURES 1, 6 and 7). A torsion spring 42 is mounted on the pivot pins 39 and has one end fixed to the adjacent brace 40 and the other bearing against its moldboard to urge it to a vertical dirt scraping position against a stop 44 provided on the truss rails 14 and 15.

A highly polished steel cutting blade 46 is mounted on and vertically adjustable with respect to each of the moldboards by nuts and bolts 47 movable in elongated slots (not shown) in the moldboards and each of the blades is of the same length and width as its supporting moldboard. Due to the equal dimensions of the moldboards and their respective blades, quick scouring and uniform movement of the dirt along the polished surfaces is obtained and the structure enables the leveler to operate effectively in damp and/or trashy ground conditions which is not possible with known prior art machines.

The land leveler 12 is towed along the ground on its skids 24, 25 as a full trailer by a tractor, etc. by means of a novel hitch comprising a tongue 49 and braces 50 of tubular steel, all terminating in bearing sleeves 51 pivotal about a transverse rock shaft 52 fixed to the frame. It will be apparent that relative motion between the towing tractor and the leveler 12 is thus permitted and compensates for ground surface irregularities as the tractor passes thereover.

The hitch also embodies novel structure which functions in cooperation with extensible wheels to automatically convert the leveler from a full trailer into a semi-trailer when the wheels are lowered with respect to the frame to engage the ground and lift the frame clear thereof.

As seen in FIGURES 1–3 inclusive, a pair of pneumatic-tired wheels 54 are mounted on axles fixed to spaced supporting arms 55 fixed to a rock shaft 56 journalled in the leveler frame just rearwardly of its midpoint. An upstanding crank arm 58 is fixed to the rock shaft 56 intermediate the arms 55 and is pivotally connected to the end of the piston rod 59 of a hydraulic cylinder 60 mounted on the transverse frame member 20. The cylinder is double acting and receives its pressure fluid from the hydraulic system of the towing vehicle by fluid lines 62 which may be supported at the forward end of the land leveler on the spring supporting plate 63 adjacent the hitch.

As seen in FIGURES 1, 2, 3, 8, 9, and 10, the support plate 63 is rigidly mounted on the tongue 49 as by welding, by an upstanding stud 53. A pair of cranks 69 are screw-threadly mounted in the ends of the plate 63 and their lower ends 64 project downwardly to terminate in headed ends provided with heavy washers 57, the latter being welded to the upper ends of heavy tension springs 67. A plate 68 having a slot 71 for the reception of an apertured locking lug 72 fixed to and depending from the tongue 49, is welded to the rear of the foremost frame member 17 and is provided with upstanding eyes 73 into which the lower ends of the torsion springs 67 are hooked.

The springs 67 thus straddle the tongue 49 and are spaced rearwardly of two transversely spaced, vertically disposed tongue guides 66 which rigidly connect the junction of the two transverse diagonal frame braces 65. The tension of the springs is readily adjusted by the cranks 69 and the adjusted position may be maintained by lock members generally designated as 74.

The tension of the springs 67 is so adjusted that when the semi-trailer wheels 54 are lowered into ground contact by the hydraulic cylinder 60 to raise the leveler frame to the position shown in FIGURES 2 and 3 (when turning the leveler at the end of a field), the tongue 49 simultaneously pivots upwardly against the tension of the springs 67 to also raise the front end of the frame. For parking purposes, a jack 70 is provided for the support of the front end of the frame at the junction of the tongue 49 and a brace 50. For highway transportation purposes, the apertured lug 72 is moved downwardly through the slot 71 where it is retained by a locking-pin (not shown).

It will be apparent that during leveling operations, the dirt is first contacted by the blades 46 on the foremost moldboards 29 and 30 which deflect it inwardly of the frame while smoothing the area in front of the shoes 24, 25, the dirt is then deflected by the blade on moldboard 31 and passes to blade and moldboard 32 where it is oppositely deflected to pass to the final blade and moldboard 33 for a final deflection in the opposite direction and discharge from the rear end side of the frame. The blades level off the high spots and the dirt thus loosened, fills up the low spots in the traverse area as it passes back and forth through the frame, the dirt not being so deposited in low areas being that which is finally discharged.

It is to be noted that the highly polished blades and their vertical coextensiveness with the moldboards prevents dirt, and especially damp or wet dirt from clinging and building up on the moldboards and thus diminishing leveling efficiency as in known machines. It will also be appreciated that stumps and other obstructions engaging the blades are not likely to damage them or their pivots, the latter being above the rearwardly pivoting blades. Further, the use of four spaced skids with and without leveling blades in their paths, ensures greater stability with less tilt (and poorer leveling) of the elongated leveler frame than shorter spanned frames or frames with coextensive skids.

The terms full trailer and semi-trailer shall be understood to mean that the leveler is fully self supported in the first case and partially supported by the towing vehicle in the second case.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. A land leveler adapted to be towed along the ground by a tractor comprising, in combination, an elongated frame having a pair of laterally spaced dirt-confining side rails rigidly connected by longitudinally spaced, transverse frame members, each of said rails including an intermediate ground-engaging and dirt confining frame portion with an upwardly displaced frame portion adjacent each end and in longitudinal alignment with said intermediate frame portion, a skid attached to said side rails at each of said upwardly displaced frame portions to provide a support adjacent each corner of said elongated frame, each of said skids being longitudinally aligned with said intermediate frame portion and including a horizontal supporting surface which lies in the same horizontal plane as said intermediate frame portions to support said side rails at dirt confining elevation, and a plurality of dirt scraping blades mounted on said frame in staggered, longitudinally spaced relationship and angularly and rearwardly disposed so as to deflect dirt transversely back and forth within said side rails and toward the rear of said frame for discharge therefrom.

2. A land leveler as recited in claim 1 wherein the skids supporting the rear corners of said frame include longitudinally extending, downwardly depending, fixed rudders to prevent lateral movement of said frame.

3. A land leveler as recited in claim 1 wherein said blades are supported by moldboards and are highly polished and coextensive therewith to cover them and prevent the building up on and drag of wet dirt thereon to interfere with the leveling of the ground.

4. A land leveler as recited in claim 1 wherein the foremost pair of said blades extends in front of and laterally outward of said frame and said frame-supporting skids so as to smooth the path thereof and minimize tilting of said frame upon uneven ground.

5. A land leveler as recited in claim 1, a hitch pivotally connected to the front of said frame for connection with the tractor, and resilient means connecting said hitch and said frame at a point spaced from the pivot of said hitch to exert a lifting effort on said frame when said hitch is pivotally moved upward with respect to said frame.

6. A land leveler as recited in claim 1, extensible wheels mounted on said frame and operable to engage the ground and lift the rear of said frame and said skids off the ground for towing as a semi-trailer, a hitch pivotally connected to the front of said frame for connection with the tractor, and resilient means connecting said hitch and said frame at a point spaced from the pivot of said hitch to exert a lifting effort on the front of said frame when said hitch is pivotally moved upward with respect to said frame upon engagement with said wheels with the ground.

7. A land leveler adapted to be towed along the ground by a tractor comprising, in combination an elongated frame having a pair of spaced, truss-type dirt confining side rails rigidly connected by longitudinally spaced, transverse frame members, each of said rails including an intermediate ground-engaging and dirt confining frame portion with an upwardly displaced frame portion adjacent each end and in longitudinal alignment with said intermediate frame portion; a skid attached to and supporting said frame at each of said upwardly displaced frame portions to provide a support adjacent each corner of said elongated frame, each of said skids being longitudinally aligned with said intermediate frame portion and including a horizontal supporting surface which lies in the same horizontal plane as said intermediate frame portions; and a plurality of dirt scraping blades mounted on said frame in staggered, longitudinally spaced relationship and angularly and rearwardly disposed so as to deflect dirt laterally confined by said side rails transversely back and forth and toward the rear of said frame for discharge therefrom; the foremost pair of said blades extending laterally outward of said frame and in front of said frame-supporting skids so as to smooth the path thereof and minimize tilting of said frame.

8. The combination recited in claim 7 wherein the skids supporting the rear corners of said frame include longitudinally extending, downwardly depending, fixed rudders to prevent lateral movement of said frame.

9. The combination recited in claim 7 wherein said blades are supported by moldboards and are highly polished and coextensive therewith to cover them and prevent the building up on and drag of wet dirt thereon to interfere with the leveling of the ground.

10. The combination recited in claim 7, a hitch pivotally connected to the front of said frame for connection with the tractor, and resilient means connecting said hitch and said frame at a point spaced from the pivot of said hitch to exert a lifting effort on said frame when said hitch is pivotally moved upward with respect to said frame.

11. The combination recited in claim 7, extensible wheels mounted on said frame and operable to engage the ground and lift the rear of said frame and said skids off the ground for towing as a semi-trailer, a hitch pivotally connected to the front of said frame for connection with the tractor, and resilient means connecting said hitch and said frame at a point spaced from the pivot of said hitch to exert a lifting effort on the front of said frame when said hitch is pivotally moved upward with respect to said frame upon engagement with said wheels with the ground.

No references cited.

ABRAHAM G. STONE, *Primary Examiner.*